United States Patent Office 3,136,705
Patented June 9, 1964

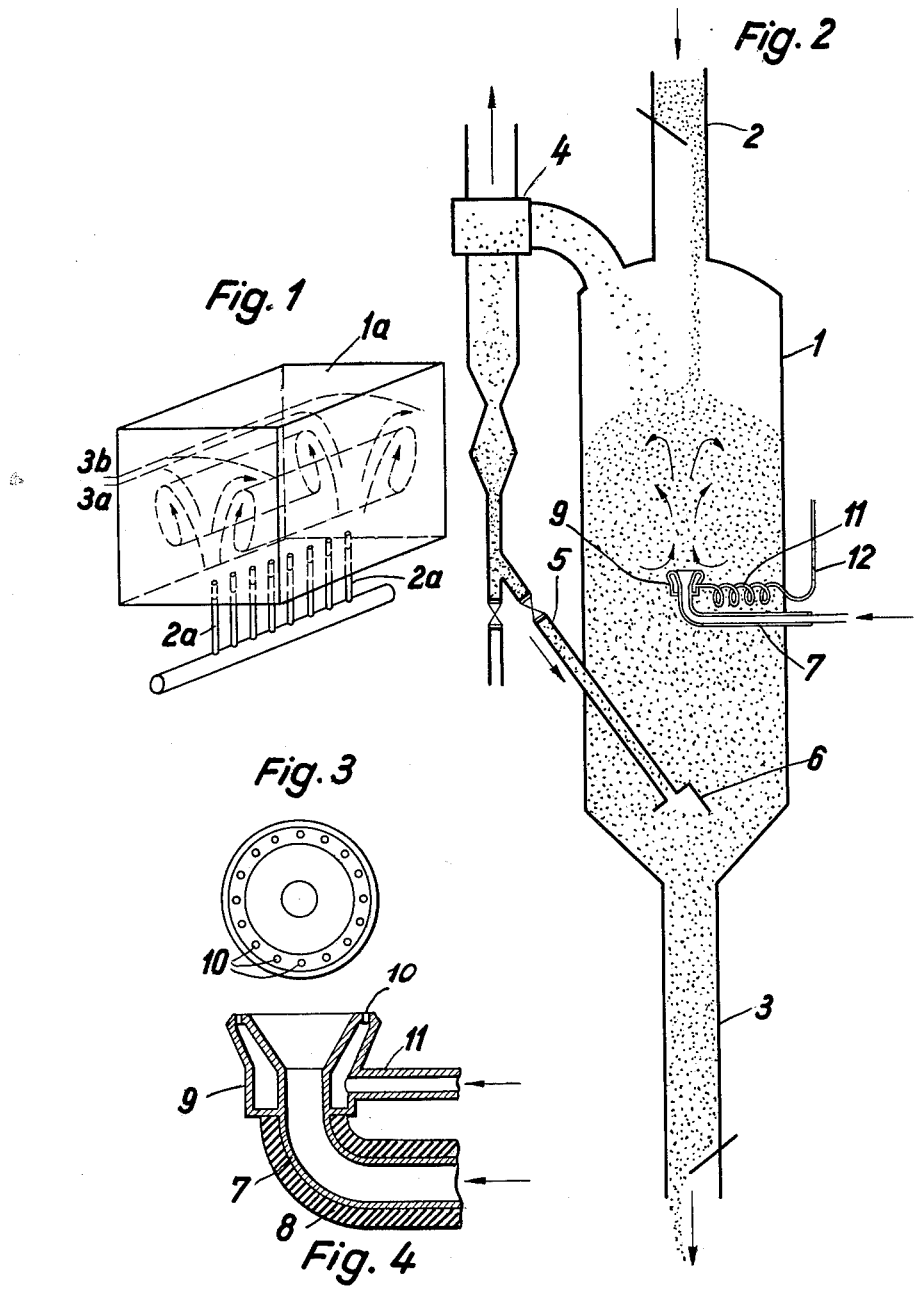

3,136,705
METHOD AND APPARATUS FOR CARRYING OUT PHYSICAL AND CHEMICAL PROCESSES BETWEEN FINELY DIVIDED SOLIDS AND GASES IN A FLUIDIZED BED
Hans Sommers, Essen, Germany, assignor to Metallgesellschaft Aktiengesellschaft, Frankfurt am Main, Germany, a German corporation
Filed Jan. 9, 1959, Ser. No. 829,177
16 Claims. (Cl. 202—14)

The present invention relates to improvements in maintaining fluidized beds, and more particularly to a method and apparatus for carrying out physical and chemical processes between finely divided solids and gases in a fluidized bed.

It is well known to produce a haphazardly surging fluidized bed in a reaction chamber filled with finely divided solids, by introducing gaseous media at a given minimum velocity through a flow-inlet plate which occupies the greater portion of the bottom surface of the reaction chamber. This velocity, depending on the particle size, shape and bulk weight of the solids is usually between 0.1 and 3 meters per second. If the velocity of the gas introduced is increased several times, an additional expansion of the bed is thereby produced. At velocities exceeding the suspension velocity of the solid particles, a flow of entrained solids is effected, such as that used for pneumatic conveyance of solid particles.

It is furthermore known to introduce a gaseous medium at a velocity of about 10 to 20 meters per second through a nozzle below the surface of a mass of finely divided solids. In this connection, where introduction of the gaseous medium from below is employed and a size of inlet opening which is small as compared with the diameter of the reaction chamber is used, namely from $\frac{1}{10}$ to $\frac{1}{100}$ of the cross-section of the chamber, a local eddying is produced which does not uniformly affect the mass as a whole. If the solids introduced are provided with an adhesive agent, such as tacky ash, caking coal or the like, there is formed within the mass a lower zone of lower density above and around which there is further formed a zone of higher density. Accordingly, the formation of agglomerations takes place and a central column of ascending solids is produced which spreads radially outwardly and drops at the sides so as to be deflected by the conical bottom part of the chamber and again pass into the ascending column in a cycle-like manner. With a sufficiently large nozzle opening of for instance $\frac{1}{10}$ of the cross-section of the reaction chamber, a dust fountain may be produced which, with the formation of channeling in the mass, results in the carrying along of large quantities of entrained solids with the gas leaving the reactor.

It is also known to produce a surging fluidized bed by means of a series of individual nozzles distributed over the entire flow inlet bottom plate or by slits arranged on the bottom plate of the reaction chamber and extending radially over the entire area of the chamber bottom, or to form the bottom of the fluidized bed by means of a grid which has at most about 10% of its area occupied by free openings, so that the stream of gas is divided into a plurality of small individual streams without any substantial drop in pressure.

It is an object of the invention to provide a method and apparatus for carrying out physical and chemical processes between finely divided solids and gases or vapors in a more or less stationary rotating fluidized bed.

Other and further objects will become apparent from a study of the within specification and accompanying drawings in which, FIGURE 1 is a schematic representation in perspective of a fluidized bed in a reaction chamber in accordance with the invention, showing details of the path of the gaseous vehicle and the location of the fluidized bed;

FIGURE 2 is a schematic sectional view of a reactor used, for instance for the low temperature carbonization of coal in accordance with the invention, showing details of construction and the flow path of the gaseous medium;

FIGURE 3 is an enlarged top view corresponding to the nozzle ring of FIGURE 4;

FIGURE 4 is an enlarged sectional view of the nozzle ring of FIGURE 2, showing in detail the feed conduit for the product to be treated and for the gaseous propellant medium, in accordance with the invention.

In accordance with the invention it has been discovered that physical and chemical processes may be conveniently carried out between finely divided solids and gases or vapors in a rotating fluidized front wherein, for instance, individual nozzles or openings having an inside diameter or width of from about 0.5 to 3 mm. arranged in a conventional manner below the mass of solid particles are provided in the reaction chamber, and the propelling gases or vapors flowing upwardly from these openings have a velocity of from about 50 to 2000 meters per second. The nozzles or openings may be situated on the reaction chamber bottom in any suitable manner such as in circular or linear form, one adjacent the other.

While fluidized beds heretofore used had only exerted fluidizing forces by means of gaseous propellants having an entrance velocity of no higher than about 10 to 20 meters per second, in accordance with the invention velocities up to about 2000 meters per second may be attained without classification of the particles or channeling of the bed. These rotating fluidized fronts which serve for the carrying out of the aforesaid reactions can also be obtained even if the gaseous media flow upwardly from a linear or circular slotted nozzle having a slot width of about 0.5 to 3 mm. with a velocity several times greater than the suspension velocity of the largest solid particles, i.e. the velocity normally needed to maintain the particles in suspension. This greater velocity may be accordingly in said range of 50 to 600 meters per second, in all cases a multiple of the suspension velocity.

The finely divided solids by means of which the physical and chemical processes in accordance with the method of the invention may be carried out may comprise any suitable solids in sizes between 0.1 and 5 mm. Thus, in this connection, heat carriers, catalysts, drying material or any other reaction material may be utilized.

As gaseous media which may be fed through the nozzles or openings to the mass of solids and by their high velocity of emergence form rotating fluidized fronts, any suitable gases or vapors such as steam or air may be used. Such fluids may be either inert or else participate in the reaction itself, and may serve as heating or cooling means as well. The gaseous media may also act as carriers for the solids or enable the introduction into the reactor of a larger or smaller quantity of other solids or liquids contributing to the process. This is accomplished by utilizing small quantities of the gaseous medium as supporting gas for these other solids or liquids, the suction action of the gaseous medium emerging at high velocity being used for this purpose.

Referring to the drawing, FIGURE 1 shows a reaction chamber 1a, containing a mass of finely divided solids which in condition of rest fills the reaction chamber to the height 3a. At a suitable distance below the surface of the mass a plurality of individual nozzles 2a are arranged in a line. Alternatively, a slot nozzle may be used (not shown). The row of individual nozzles or the length of the slot nozzle covers approximately the breadth of the reaction chamber bottom. The inside diameter of the individual nozzles may be, for instance, 2 mm., while the slot width of the alternatively used slot nozzle may be, for instance 1.5 mm. A gaseous medium is introduced through the nozzles at a velocity which several times exceeds the suspension velocity of the solid particles of the mass and may amount, for instance, to 400 meters/second. The upper limit of the velocity range of the emerging gaseous media is comparable to the velocity of sound in that it is dependent upon the temperature as well as other properties of the gas or vapor, and may be approximately between 300 and 2000 meters per second. As a result of the gaseous media emerging at such a high velocity, two rotating or cyclic fluidized fronts are formed in the mass, the positions of which remain unchanged with respect to the height of the reaction chamber. In this case, the mass expands slightly upwardly to the height 3b, the axes of rotation of said fluidized fronts being situated in the direction of the flow of the gas at a given distance from and parallel to the nozzle line and consequently above it. In this connection, the surface of the mass is arched approximately in the form of a horizontal cylindrical surface. This quiet, stationary fluidized movement extends through the entire cross-section of the mass and extends from the nozzle line up to the surface of the mass, and even to some extent below the nozzle line.

FIGURE 2 shows the reactor 1 having a diameter of about 1 meter, a regulating slide valve 2 for feeding the finely granular heat carrier, and a blocking path 3 which, as can be seen, is filled with the charge. The separatory cyclone 4 serves to remove the solids entrained by the discharging gas, the solids being returned to the mass by means of the return conduit 5 and the roof-shaped distributor 6. The solids to be treated are fed through pipe 7, and the gases or vapors through line 12 and coil 11. These gases or vapors then flow out through nozzle ring 9 and entrain the solids as a result of attendant suction, distributing these solids uniformly in the mass within a very short period of time.

FIGURES 3 and 4 show the nozzle ring in top view and in section. The feed pipe 7 is surrounded by refractory heat insulation 8. The vapor or gas is fed through pipe 11, which in this case is shown as a super heater coil, and then flows out through nozzles 10 of the nozzle ring 9, which surround the feed pipe.

In the embodiment shown in FIGURE 2, where a reaction chamber having the shape of a vertical cylinder is provided, the introduction of the gaseous medium is preferably effected through individual nozzles arranged along a circle or through an annular slotted nozzle. However, the individual nozzles or the slot nozzle can also be so directed that the axes of the jets which emerge deviate from the vertical and correspond to the generatrix of a narrow cone. There is thus produced in the cylindrical reaction chamber, a stationary annular eddy, the ring of which is concentric above the circle line defined by the individual nozzles. Additionally, the surface of the entire bed is arched upward in the approximate form of a spherical surface, as can be noted in FIGURE 2.

Depending upon the size and distribution of the individual nozzles or the width of the slot, the velocity of the inward flowing medium can be brought to the velocity of sound relative to its temperature and its properties without channeling or dust fountains occurring, provided that suitable minimum spacing of the nozzles from the surface is maintained. This minimum distance is advantageously between 0.5 and 2 meters and is dependent upon the diameter of the shaft, the particle size and shape, the bulk weight, and the quantities and velocities of the emerging media. The stationary fluidized movement covers the entire cross-section of the mass down to the height of the individual nozzles and as a result of the suction action, even extends below this somewhat. A movement of the bulk material similar to the annular fluidized mass eddy in the cylindrical reaction chamber can also be maintained in a reaction chamber of rectangular or square cross-section, if the length of the row of individual nozzles is only about one-half the length of a side of the rectangle or square. In this way, two parallel eddy fronts are formed.

In large reaction chambers, a plurality of the systems above described with stationary, parallel eddy fronts can be used alongside of each other. The advantage of this method is that a lower height of the mass above the emergence openings of the individual or slot nozzles can be maintained.

The fluidized beds effected by the methods described above, although they may be with or without annular eddy, for the purpose of this invention, are all contemplated by the term "annular fluidized bed," in the specification and in the appended claims.

As a further feature of the invention, it is also possible to introduce into the solids eddied in the annular fluidized bed, other solid materials in dust-like or finely granular form or liquid materials in mist-like or droplet form, together with the gaseous medium, and to achieve their very intense and almost immediate mixing with the solids forming the fluidized bed. In order to avoid possible abrasion and erosion of the individual nozzles during such operation it is advantageous to conduct the substances to be admixed to the annular fluidized bed to the vicinity of the individual nozzles or slot nozzles by means of small quantities of vehicle gas so that the suction of the emerging medium from said nozzles entrains these substances and mixes them with the solids of the annular fluidized bed. The vehicle gas may consist of inert gases or vapors or of gases or vapors which participate in the reaction. These quantities of vehicle gas thereafter may be preferably separated and removed from the gaseous medium which produces the annular fluidized bed.

The abrasive action of the solids of the annular fluidized bed is surprisingly no greater than that which occurs in the haphazardly surging fluidized bed of conventional methods, and under optimum conditions may be even less. Such optimum conditions are present when the surface of the bulk material arches at the top of the bed. This is in all probability due to the fact that the movement of the solid particles takes place in less turbulent flow lines wherein the relative movement and friction of adjacent particles is less than that of the preferably random movement of particles in conventional haphazardly surging fluidized bed.

In the annular fluidized bed, provided in accordance with the invention, smaller quantities of fine dust particles are entrained by the gaseous medium introduced and by gases or vapors possibly produced in the annular fluidized bed, which thereby leave with the exit gases from the reaction chamber, than in the case of haphazardly surging fluidized beds. This is due to the fact that in conventional methods the gas bubbles, which arise eruptively and which cause channeling as well as surging and boiling of the bed, entrain such fine dust, the "slugging" or abrupt motion of the bed in particular reinforcing the entrainment. In contradiction to this, in accordance with the invention, there is no slugging of the annular fluidized bed as long as no dust fountains form. Dust fountains occur where the height of the fluidized bed layer above the nozzle is too small. Furthermore, while in the conventional haphazardly surging fluidized bed, a classification of the solid particles may take place such that the coarsest particles accumulate at the bottom and the finest particles stratify in the uppermost layer, in accordance with the invention, very fine particles which penetrate to the top surface of the bed are for the most part returned into the eddy due to the development and maintainence of the stationary rotating and curling eddy front.

The method of the invention may be employed in fluido-solids processes wherever liquids or dust-like or finely granular solids are sought to be mixed rapidly with a large quantity of finely divided solids without considerable quantities of gas being required as propelling agent for the movement and mixing of the substances. The method of the invention finds advantageous application in cases in which conventional haphazardly surging fluidized beds would otherwise require undesirably large quantities of gas for energizing movement or in which large quantities of dust would be entrained by the gaseous medium introduced or by the gases and vapors produced in the treatment, or in which the distribution or mixing of the substances in a very short time would afford considerable difficulties, or in which the occurrence of agglomerations would be undesirable. The small quantity of propellant medium required by the method of the invention results in the removal of less heat from the mass, if desired. In addition to this, when employing steam as propellant medium, substantially smaller cooling surfaces and correspondingly less cooling agent for condensation of the steam are required.

Another feature of the invention is that it permits the working of coking coal in a fluidized bed, which was for all practical purposes impossible to achieve with previously known fluidized bed processes.

Moreover, the invention may be advantageously used for circulatory processes concerning finely divided solids, such as heat-carriers, catalysts and reaction materials. Thus, ordinarily finely divided solids may be passed through two chambers in such a manner that they are blown with gaseous medium through one chamber and thereafter flow through a second chamber, the reaction chamber. In the reaction chamber, an annular fluidized bed is conveniently employed for advantageous treatment of such finely divided solids. The invention can be employed in cyclic processes of finely divided solids and liquids as well, such as in the degasification of solid, finely divided fuels, or even in the distillation and cracking of liquid hydrocarbons.

Among the granular finely divided solids which may be used are coal, sand, rock, ore, solid catalysts and the like. The gaseous or vaporous media which may be used include steam, air and inert gases. The finely divided materials which may be carried into the reaction chamber with the carrier gas or vapor may include coking dust, fine solid particles to be reacted, liquid droplets such as liquid hydrocarbons, and may include liquid petroleum products such as gasoline, crude oil, and heavy residue oils, and the like.

Generally, therefore, in accordance with the invention, a fluidized gas and vapor is upwardly directed through a mass of finely divided solids, at a velocity substantially in excess of the velocity required to fluidize said mass, in the form of an upwardly diverging stream from a narrow source, whereby said stream forms a stationary rotating eddy. While heretofore such velocities would lead to channeling, classifying and bubbling of the bed, causing the solid particles to become entrained in the gas stream and pass out of the reaction chamber with the exit gas, because of the employment of a narrow source for the inlet of the gas and because the gas upwardly diverges as it expands, a stationary rotating eddy is formed above each source which curls back upon itself. This rotating area in cross-section takes the form of a curl or roll shape while its geometric configuration may be arched or annular in form, depending on whether the source is linear or annular. Due to this rotating eddy motion of the bed, the solid particles and the gas calmly, intimately, fully and rapidly intermix enabling physical and chemical processes to be carried out in less time and with greater efficiency than was heretofore possible.

The concomitant intermixing of finely divided solids and liquids introduced with a carrier gas is possible since the main high velocity stream forms a Venturi effect which enables these suspended solid and liquid particles to be sucked into the main stream entering the reaction chamber adjacent thereto, whereby these suspended solids and liquids equally, calmly, intimately, fully and rapidly intermix with the gas and fluidized solids.

The following examples are set forth by way of illustration, and the invention is not to be limited thereto.

*Example 1*

The reactor shown in FIGURE 2 is filled up to about 1 meter above the nozzle ring with finely granular coke heated to about 900° C. About 10 tons per hour of the coke are discharged from the reactor via the regulating slide valve 13. Into the pipe coil 11, steam is introduced at 400° C., which is superheated by contact with the bulk material surrounding the coil to about 600° C. The superheated steam flows out of the 60 individual nozzles provided in the nozzle ring, each of which has a diameter of 0.5 mm., with a velocity of about 500 meters per second. The distance apart of the individual nozzles is 1.8 mm. At the same time, 300 kg./hour of strongly coking coal in dust form having a coking value of 20 (according to Damm) are introduced through the coal feed pipe 7 at a lower velocity, for instance, 10 meters per second, together with 10 cubic meters (at standard temperature and pressure) per hour of the produced gas which, upon leaving the separating cyclone 4, is aftertreated in a condensation plant. The steam emerging from the nozzle ring 9 passes into the bulk material to develop and maintain a stationary annular eddy which arches the entire mass of material disposed above the height of the nozzle ring approximately in the form of a partial surface of a shphere of larger diameter than the diameter of the shaft. Neither the formation of bubble cavities nor slugging can be noted in the fluidized bed. The strongly coking coal introduced is mixed practically instantaneously with the eddying of hot coke dust, and is thereby very rapidly heated and coked without any disturbing agglomerations occurring. The quantity of steam used as propelling medium is only 3 to 5 kg./hour. The coal which has become coke as a result of this coking operation is discharged continuously with a portion of the circulating coke, which also serves as heat carrier at a temperature of about 850° C., through the drop 3 serving as blocking path in order to be heated in known manner. The coke is conveyed to a storage place from whence it may be recycled back via the control valve 2 into the reactor 1. 160 kg. of coke are removed from the circuit per hour.

While a haphazardly surging fluidized bed of the same depth with an addition of coal of only 100 kg. per hour yields about 30 to 50 kg. per hour of very fine dust in the cyclone separator and consumes considerably larger quantities of steam for the production of the fluidized bed, only 3 to 10 kg. of dust are separated in the cyclone 4 in the case of the annular fluidized bed of the invention in Example 1 with a charge of 3 times the quantity of coal.

*Example 2*

The same reactor used in Example 1, of a diameter of 1 meter, can be used to crack hydrocarbons, for instance liquid gases, gasoline, crude oil or the like in preferred manner into olefines. In this connection, about 30 tons of sand of a particle size of preferably 0.3 to 1.2 mm. and a temperature of 850° C. flow into the reactor per hour. Steam is injected through the 60 individual nozzles in a quantity of about 5 kg./hour. Through the center of the ring of the individual nozzles, 1000 kg. of gasoline are introduced per hour into the said bed in vaporized state at a temperature of 350° C. The gasoline vapors are heated suddenly by the hot sand and thus are cracked. Because there is a very short reaction time of about 0.3 second, there is a preferred formation of olefines in the presence of only a limited quantity of steam. Since the annular fluidized bed operates without slugging and since no dust fountains are produced, quenching nozzles may be provided directly above the annular fluidized bed.

The quenching nozzles spray water into the vapors as they leave the annular fluidized bed and by evaporation cool the vapors to about 500° C. so that the olefine vapors formed cannot be altered or destroyed.

*Example 3*

The reactor used in Examples 1 and 2 can also advantageously be used for the coking of heavy residue oils. Heavy residue oils produce large quantities of coke in which connection there is always the danger in cyclic processes that large lumps of coke will form which will considerably disturb and hinder the cyclic process. The use of an annular fluidized bed eliminates this danger.

The coking of the residue oils is thus effected preferably by circulating coke which is formed in the process and which is heated in a heating chamber to about 700° C. In this way, 20 tons of coke of a particle size of between 0.2 and 3 millimeters are fed to the reactor having a diameter of 1 meter. Through the individual nozzles, 10 kg. of vapor are introduced per hour at a high velocity, thus forming the annular fluidized bed. In the center of the circular ring of individual nozzles, 1500 kg. of heavy residue oils having a preheated temperature of about 250° C. are introduced. These oils are rapidly heated by the hot coke and are coked by distillation of the volatile components. The coke thus formed deposits on the individual coke particles, so as to continuously increase their size. The vapors discharge from the annular fluidized bed via a cyclone into a condenser in which they can be recovered and fractionated. The larger coke particles are continuously removed from the circuit.

*Example 4*

The reactor of the foregoing examples may be used in accordance with the invention in the distillation of sulfur from sulfur rock. Sulfur rock, upon heating, liberates sulfur in vapor form, the sulfur becoming liquid at first and making the rock plastic. The distillation is preferably effected by heating the rock by means of hot heat-carriers, such as the rock residue which has been freed from its sulfur content. In order to avoid difficulties in distillation since the rock is in plastic condition, an annular eddy is employed in accordance with the invention. Hence, steam or an inert gas is passed at high velocity through the individual nozzles to produce the annular fluidized bed. In the center of the individual nozzles, sulfur rock of a particle size of between 0.1 and 3 mm. is introduced, which rapidly mixes in the annular fluidized bed with the hot residue. The rock is thereby heated and allows the sulfur to volatilize. The mixture of the sulfur rock with the large mass of heated residue is so intimate and uniform that the transition of the rock from plastic condition is rapidly effected and agglomerations are prevented.

In the same way, other finely divided solids, such as catalysts, ores, granulated slags, minerals, can be treated with fine solids, liquids and vapours in carrier gases in accordance with the invention.

I claim:

1. In a fluidized process in which a bed of finely divided solids is maintained in a fluidized state by an upwardly moving stream of fluidizing gas, the improvement which comprises passing at least a portion of the fluidized gas upwardly through the bed at a velocity substantially in excess of fluidizing velocity, said gas entering the bed in the form of an upwardly diverging stream from a narrow source at a velocity of 50 to 2,000 meters per second, said stream forming a stationary rotating eddy, and said source being at least one restricted width opening having a width of from 0.5 to 3 millimeters.

2. A method as in claim 1, wherein said gas passes through the bed at a velocity within the range of 50 to 600 meters per second.

3. A method according to claim 1, wherein said finely divided solids have a particle size within the range of 0.1 to 5 millimeters.

4. A method according to claim 1, wherein said solids act as a catalyst for the reaction.

5. A method according to claim 1, wherein said solids act as a heat carrier.

6. A method according to claim 1, wherein said solids comprise a reaction material.

7. A method according to claim 1, wherein said solids are coke particles pre-heated to a temperature of at least about 700° C.

8. A method according to claim 1, wherein said gas is a heating gas.

9. A method according to claim 1, wherein a portion of said gas is a carrier gas.

10. A method as in claim 9, wherein said gas is steam.

11. In a fluidizing process in which a bed of finely divided solids is maintained in a fluidized state by an upwardly moving stream of fluidizing gas, the improvement which comprises coking finely divided carbon-containing particles in a fluidized bed of hot coke particles by upwardly passing cokable carbon-containing particles in a carrier gas stream from a single central source through a mass of finely divided hot coke particles disposed thereabove in fluidized condition, while upwardly conducting from a narrow annular source consisting of a plurality of restricted width openings, each having a diameter of from 0.5 to 3 millimeters, arranged in annular form intimately concentrically surrounding said central source, steam in the form of an upwardly diverging stream through the mass of finely divided coke particles disposed thereabove at a velocity sufficient to maintain the mass in fluidized condition a predetermined distance above the point at which said steam is conducted from said annular source and to cause intimate admixing of said steam with said particles, said velocity being substantially in excess of the fluidizing velocity of the fluidized coke particles and ranging between 50 and 2000 meters per second.

12. Process according to claim 11 wherein said carbon-containing particles are coal dust particles.

13. Process according to claim 11 wherein said carbon-containing particles are finely divided liquid hydrocarbon droplets.

14. In an apparatus for carrying out physical and chemical processes between finely divided solids and gases in a fluidized bed including means defining a closed chamber, an inlet means disposed at the top portion, and an exit means disposed at the bottom portion of the chamber means, and gas outlet means at the top portion of said chamber means for withdrawing a gas from said chamber means, the improvement which comprises first conduit means and second conduit means separate from each other and extending into said chamber means, said first conduit means having an outer concentric annular conduit portion terminating in restricted width vertically directed annular opening means having a width substantially between 0.5 and 3 millimeters for conducting said gas at high velocity vertically upwardly into said chamber means, and said second conduit means having an inner concentric conduit portion terminating in substantially vertically directed central nozzle unobstructed single opening means, separate from and cooperating with said outer conduit portion annular opening means, for conducting a material to be treated in admixture with a carrier gas substantially vertically upwardly into said chamber means, said outer and inner conduit portions being separated from one another by a common intermediate wall, and both said opening means vertically upwardly terminating in a substantially common horizontal plane normal to both said vertically directed opening means in said chamber means intermediate the top and bottom portions of said chamber means.

15. Improvement according to claim 14 wherein additional means are provided for separating entrained particles from said gas in said withdrawing means and for recycling said particles into said chamber means below said means for conducting a gas at high velocity into said chamber means.

16. Improvement according to claim 14 wherein said restricted annular opening means defines a plurality of openings having a diameter of from 0.5 to 3 millimeters arranged in a circular configuration.

References Cited in the file of this patent

UNITED STATES PATENTS

| | | |
|---|---|---|
| 1,421,296 | Owen | June 27, 1922 |
| 1,438,133 | O'Rourke | Dec. 5, 1922 |
| 2,544,603 | Lamar et al. | Mar. 6, 1951 |
| 2,689,973 | Lee et al. | Sept. 28, 1954 |
| 2,786,280 | Gishler et al. | Mar. 26, 1957 |
| 2,934,241 | Akesson | Apr. 26, 1960 |

FOREIGN PATENTS

| | | |
|---|---|---|
| 763,369 | Great Britain | Dec. 12, 1956 |